United States Patent [19]

Hoffer et al.

[11] Patent Number: 4,685,764
[45] Date of Patent: Aug. 11, 1987

[54] SPLICE ORGANIZER FOR OPTICAL CABLE SPLICES

[75] Inventors: John C. Hoffer; Bernard G. Caron, both of Harrisburg; Martin R. Rupert, Hummelstown, all of Pa.

[73] Assignee: AMP Incorporated, Harrisburg, Pa.

[21] Appl. No.: 729,101

[22] Filed: Apr. 30, 1985

Related U.S. Application Data

[63] Continuation-in-part of Ser. No. 697,311, Feb. 1, 1985.

[51] Int. Cl.⁴ .................................................. G02B 6/44
[52] U.S. Cl. .......................... 350/96.20; 350/96.22; 350/96.23; 174/93
[58] Field of Search ............. 350/96.20, 96.21, 96.22, 350/96.23; 174/92, 93

[56] References Cited

U.S. PATENT DOCUMENTS

| | | | |
|---|---|---|---|
| 4,236,047 | 11/1980 | Haeder | 174/77 R |
| 4,237,335 | 12/1980 | Giebel et al. | 174/92 |
| 4,266,853 | 5/1981 | Hutchins et al. | 350/96.20 |
| 4,319,951 | 3/1982 | Korbelak et al. | 350/96.22 |
| 4,332,435 | 6/1982 | Post | 350/96.20 |
| 4,359,262 | 11/1982 | Dolan | 350/96.20 |
| 4,373,776 | 2/1983 | Purdy | 350/96.20 |
| 4,418,982 | 12/1983 | Williams | 350/96.20 |
| 4,428,645 | 1/1984 | Korbelak et al. | 350/96.20 |
| 4,500,166 | 2/1985 | Kunze | 350/96.20 |
| 4,502,754 | 3/1985 | Kawa | 350/96.20 |
| 4,518,817 | 5/1985 | Kirby et al. | 350/96.20 |

FOREIGN PATENT DOCUMENTS

| | | | |
|---|---|---|---|
| 61367 | 9/1982 | European Pat. Off. | 350/96.20 |
| 3033928 | 3/1982 | Fed. Rep. of Germany | 350/96.20 |
| 154212 | 9/1982 | Japan | 350/96.20 |

*Primary Examiner*—William L. Sikes
*Assistant Examiner*—Frank González

[57] ABSTRACT

A splice organizer for optical cable splices within a splice closure assembly having end walls, supporting bars joining the end walls and bridging between the space therebetween, corresponding optical conductors of optical communications cables projecting into the splice closure space, optical connector bodies terminated to corresponding optical conductors, and optical splices formed by pairs of the optical connector bodies in axial alignment, to transmit optical signals between corresponding optical conductors terminated to the optical connector bodies in axial alignment, a series of receptacles for the corresponding pairs of optical conductors. Each of the individual splice organizers cooperates with an adjacent splice organizer, and the last one with an end plate, to provide an individual receptacle for holding therein the optical splice and loosely coiled lengths of corresponding optical conductors. Individual splice organizers, of a plurality of cooperating splice organizers, are clamped by clamp bars onto the supporting bars to form the splice closure assembly.

8 Claims, 14 Drawing Figures

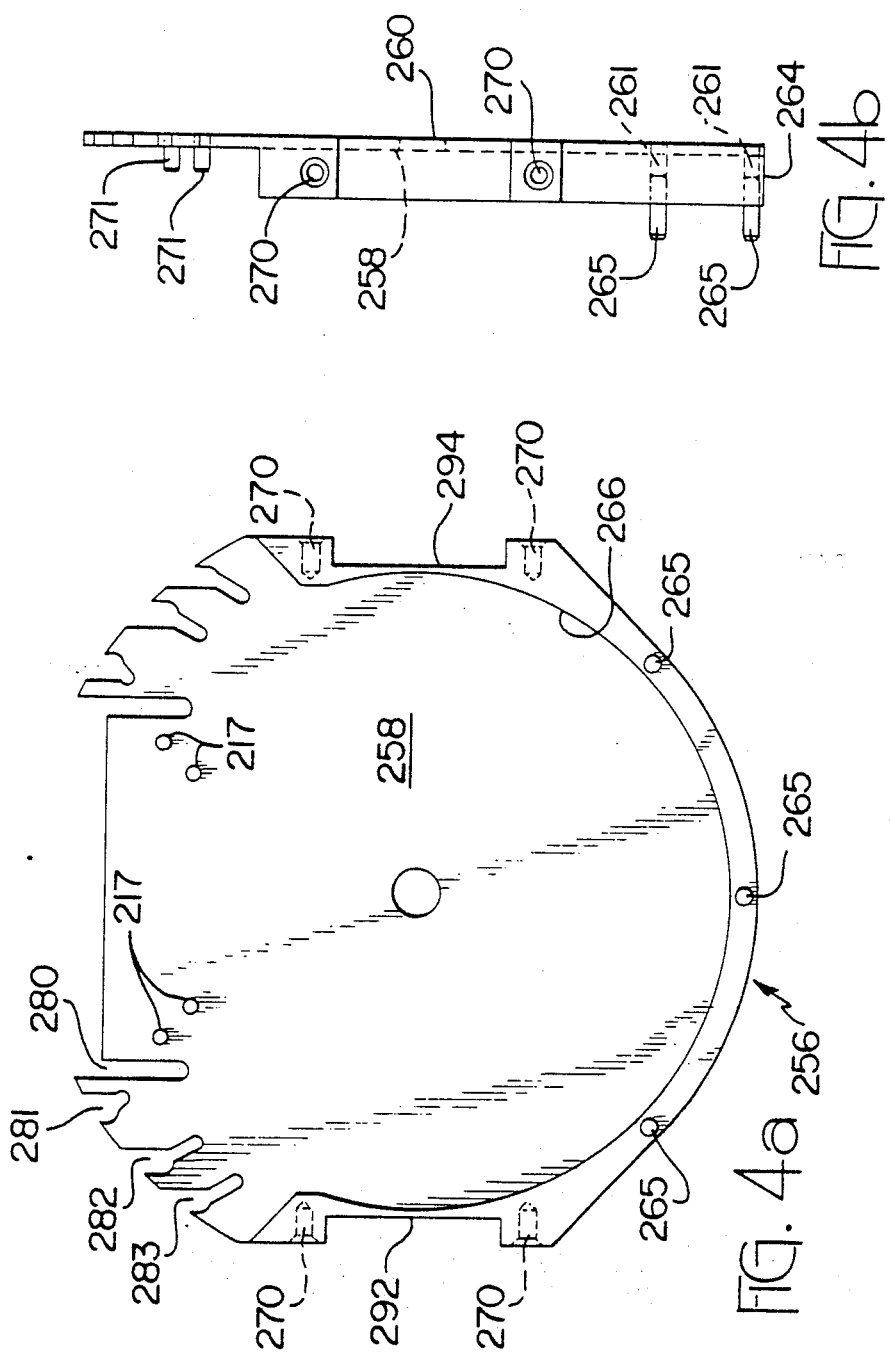

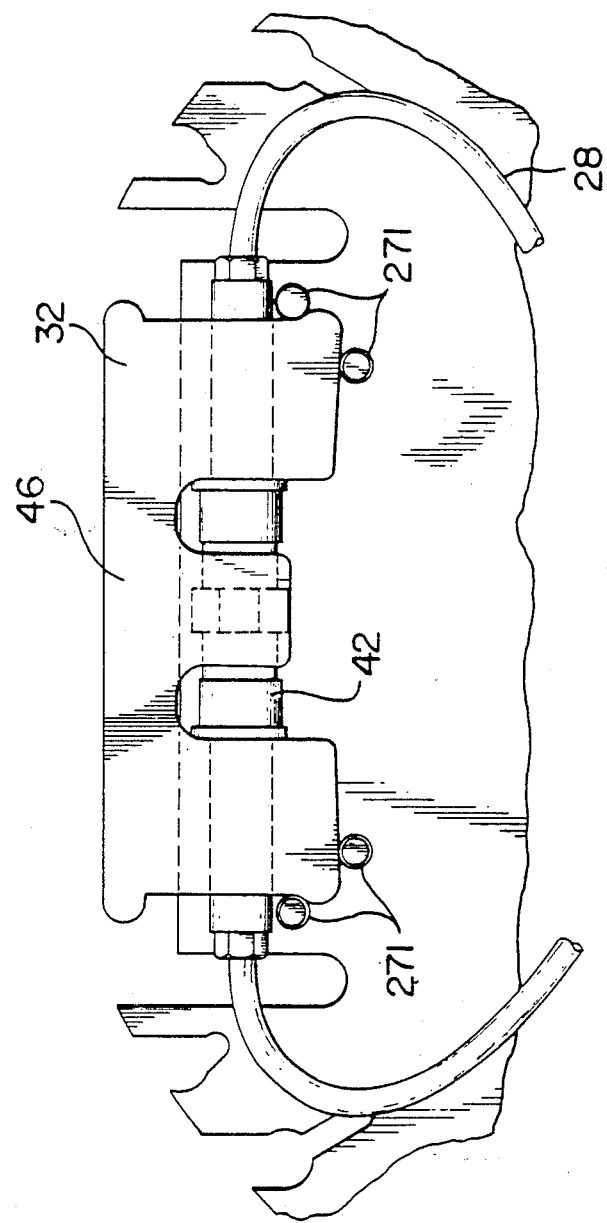

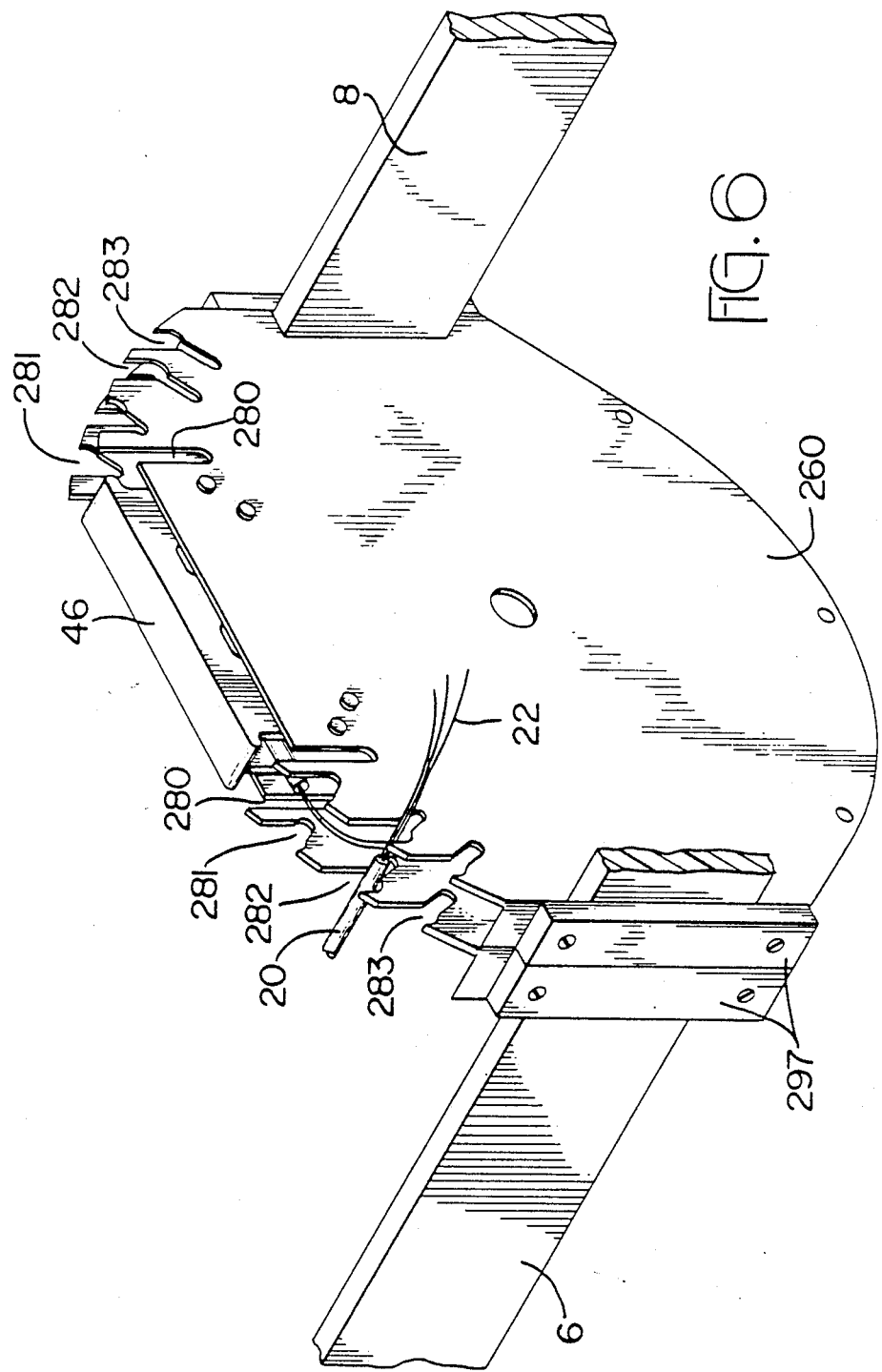

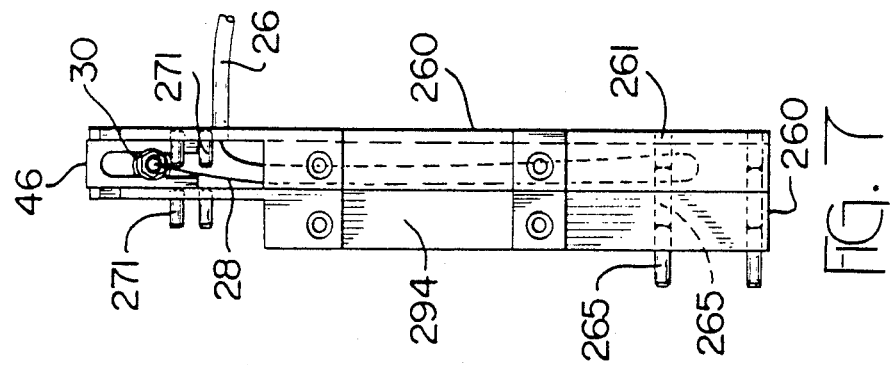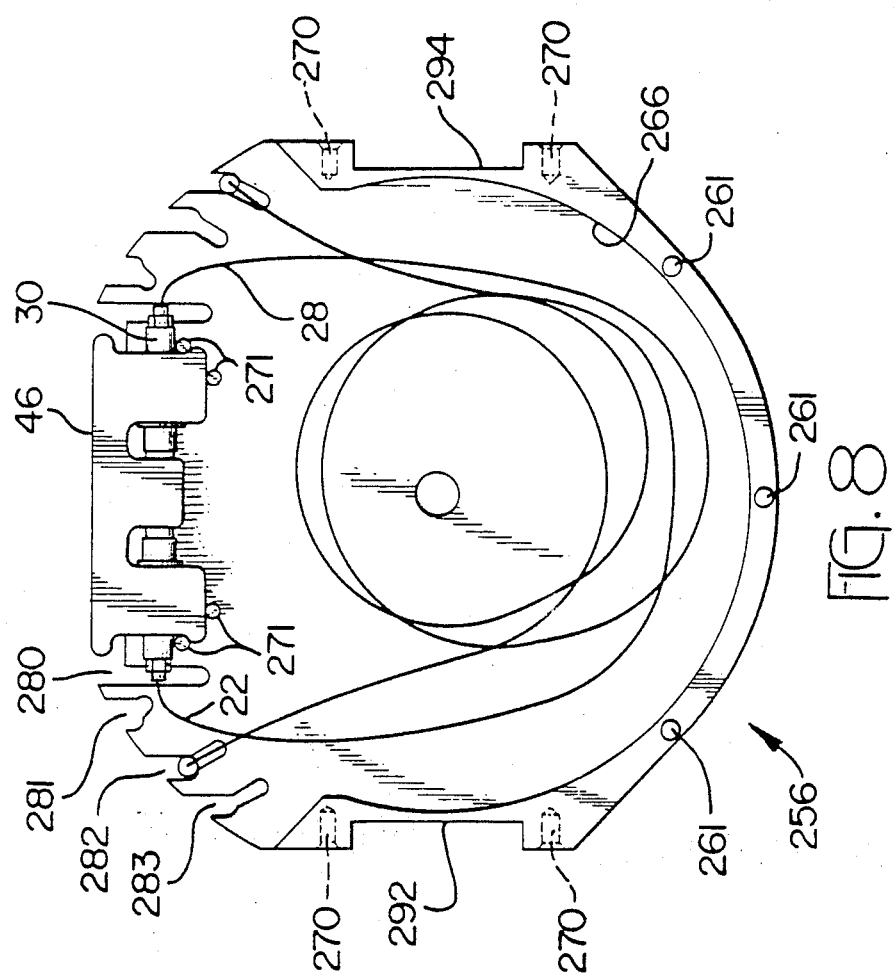

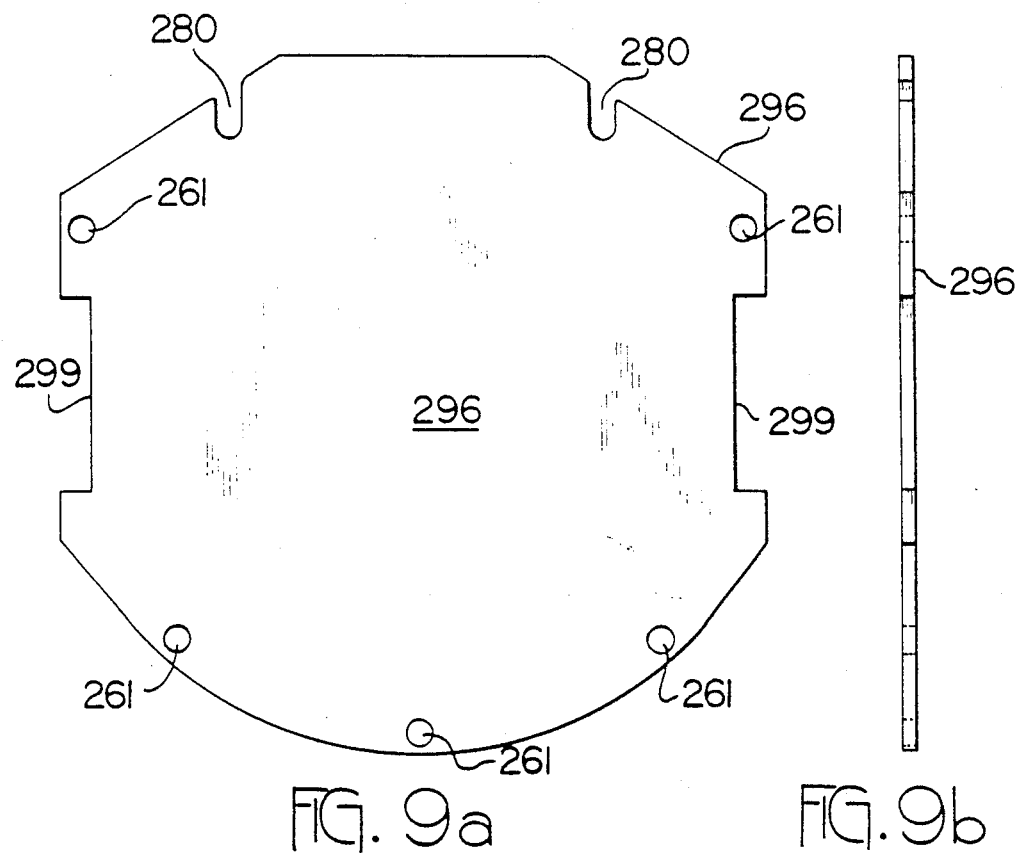
FIG. 9a
FIG. 9b
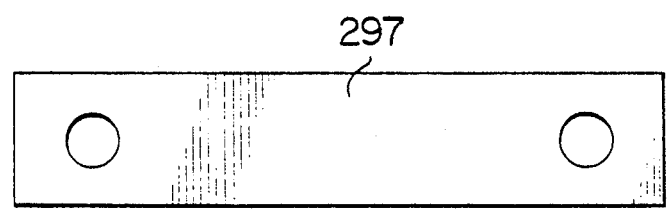
FIG. 10a
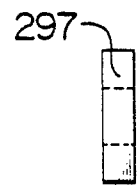
FIG. 10b
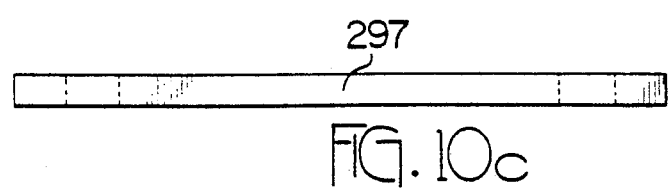
FIG. 10c

SPLICE ORGANIZER FOR OPTICAL CABLE SPLICES

CROSS REFERENCE TO OTHER APPLICATIONS

This application is a continuation-in-part of copending application Ser. No. 697,311 (still pending), filed Feb. 1, 1985, titled "A Splice Organizer for Optical Cable Splices."

FIELD OF THE INVENTION

This invention relates to the field of splice closure assemblies, and especially to a splice organizer for optical cable splices within a splice closure assembly.

BACKGROUND

A typical optical communications cable has a tough outer sheath, enclosing a plurality of optical fiber conductor cables, each having its own casing or sheath around a plurality of optical fibers. A splice closure assembly such as a Siemens closure is in the form of a protective case that clamps onto the preterminated ends of two communications cables containing optical conductors, and forms a sealed enclosure for splices of the conductors. An optical splice closure assembly is normally characterized by end walls, supporting bars joining and bridging between the end walls, a splice closure space between the end walls, optical cables projecting through the end walls and into the splice closure space, optical connector bodies terminated to corresponding optical conductors, and optical fiber splices formed by pairs of the optical connector bodies in axial alignment within corresponding sleeve housings to transmit optical signals between corresponding optical conductors. Further details of prior art splice closure assemblies may be found in the disclosure of each U.S. Pat. Nos.: 4,103,911, 4,002,818, 4,087,190, 4,236,047 and 4,237,335.

The optical conductors of an optical communications cable are manufactured with diameters in the range of 100 microns to 500 microns. A micron is 0.00004 inch. These conductors are susceptible to breakage and are readily snagged in crevices or on sharp protuberances. Accordingly, there is a need for a splice closure assembly which protects the optical conductors from snagging and breakage. Furthermore, there is a need to prevent tangling of the optical conductors within a splice closure assembly, since tangling increases the likelihood of damage to the conductors.

SUMMARY OF THE INVENTION

This invention resides in a splice organizer for optical cable splices within a splice closure assembly that typically comprises a number of organizers and has a relatively small outside diameter, e.g. approximately 6". Each organizer serves to provide a receptacle for receiving the optical conductors preterminated by optical connector bodies, and an optical splice formed by one pair of optical connector bodies in axial alignment to transmit optical signals between the single pair of optical conductors terminated to these optical connector bodies. Each receptacle allows access to individual identification of, and removal of the splice at a later date, and is formed with flat side walls. The space defined by two adjacent organizers, or the last organizer and an end cover to serve as an end wall, constitutes a single receptacle and contains lengths of optical conductors extending from the optical cables and connected to the optical fiber splice mounted therein. Each splice organizer can be firmly affixed to the supporting bars of a splice closure assembly, with each organizer side wall defining an individual receptacle substantially parallel to the end walls of the splice closure assembly. Multiple receptacles, formed by a plurality of splice organizers, are readily combined by stacking the organizers within the splice closure assembly.

It is an object of this invention to provide a splice organizer which contains and protects optical conductors of an optical cable from tangling, breaking and snagging within a splice closure assembly, allows individual identification of each conductor, and allows access to and removal of the conductors and the splice between them at a later date.

Another object of the invention is to provide a splice organizer, for optical cable splices within a splice closure assembly having end walls, supporting bars joining the end walls and bridging between the end walls, a splice closure space between the end walls, optical cables entering the end walls, corresponding optical conductors of the optical cables projecting into the splice closure space, optical connector bodies terminated to corresponding optical conductors, and optical splices within the splice closure space formed by pairs of the optical connector bodies in axial alignment to transmit optical signals between corresponding optical conductors.

Yet another object of the invention is to provide multiple splice organizers stacked together within a splice closure assembly, wherein each splice organizer cooperates with an adjacent splice organizer or an end cover to provide a receptacle or compartment for containing and protecting lengths of optical conductors and connector bodies terminated to the conductors and an optical splice formed by a pair of the connector bodies in axial alignment within a sleeve housing.

BRIEF DESCRIPTION OF THE DRAWINGS

Reference is now made to the drawings, wherein:

FIGS. 4a and 4b are end and side elevation views of a splice organizer;

FIG. 5 is a fragmentary elevation end view of a portion of the splice organizer of FIG. 4, illustrating how a splice is mounted thereon;

FIG. 6 is a side elevation view, in section, of two cooperating splice organizers, holding a splice therebetween;

FIG. 7 is a fragmentary perspective of the two splice organizers of FIG. 5, with parts assembled and prior to being mounted to supporting bars of the splice closure assembly of FIG. 1;

FIG. 8 is an end elevation of the splice organizer shown in FIG. 5, in position between the supporting bars;

FIGS. 9a and 9b are end and side elevation views of a flat end cover; and

FIGS. 10a-c are side and end elevation and a plan view of a clamping bar.

DESCRIPTION OF PREFERRED EMBODIMENTS

Figure 1:
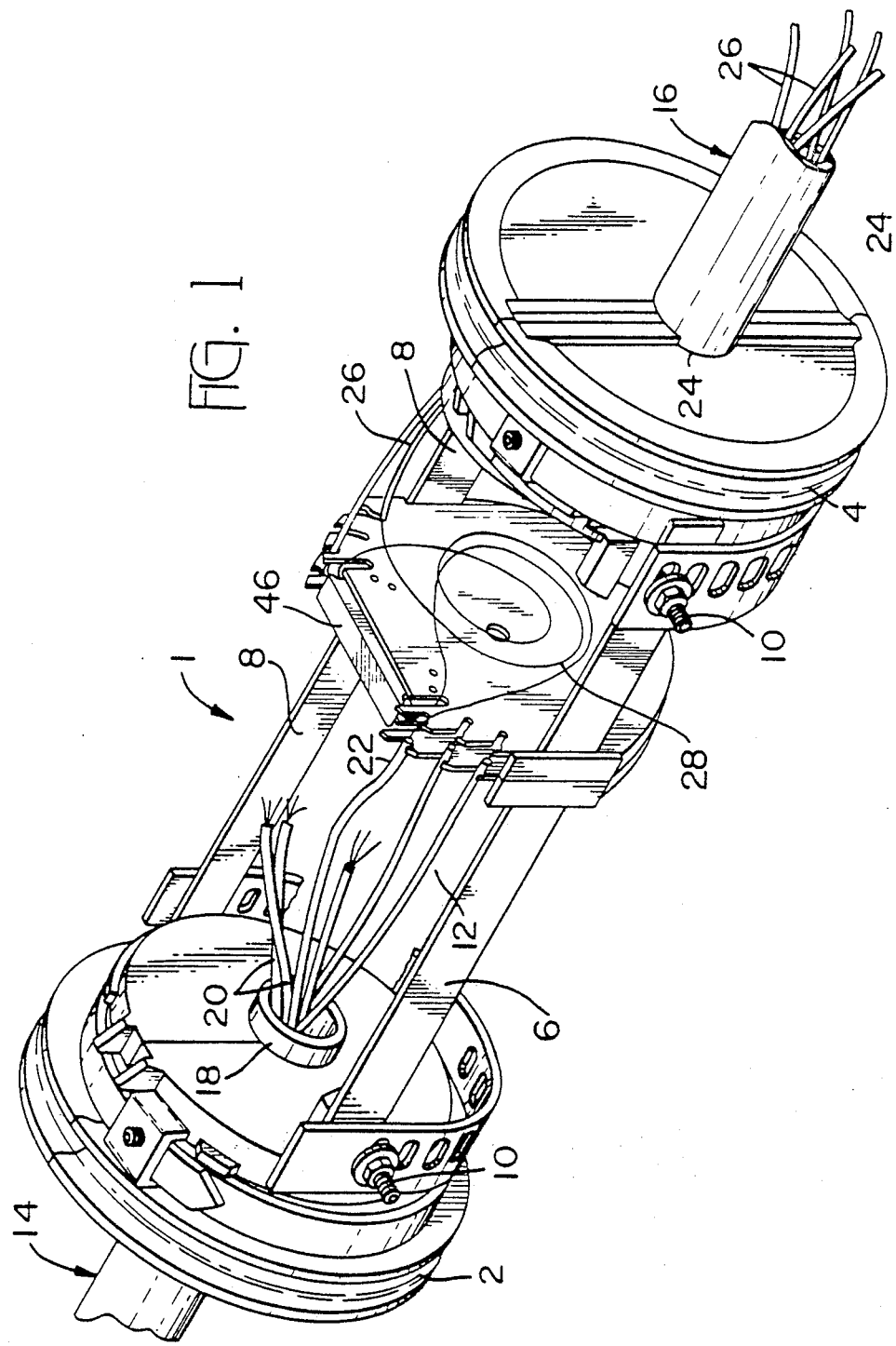
FIG. 1 is a perspective view of a splice closure assembly, with an outer cover removed to illustrate a plurality of splice organizers, for organizing optical cable splices within the splice closure assembly.

With reference to FIG. 1, there is shown a splice closure assembly 1 in the form of a receptacle having cylindrical end walls 2 and 4. At least two metal supporting bars 6 and 8 bridge between the end walls 2 and 4 and are secured by fasteners, some of which are shown at 10. A splice closure space 12 is thus defined between the end walls 2 and 4. A pair of optical communications cables 14 and 16 extend through the end walls 2 and 4 and into the space 12. The cable 14 has an outer sheath or jacket 18 containing a series of smaller cable jackets 20. Each jacket 20 contains one or more optical conductors 22 which are manufactured with diameters in the range of 100 to 500 microns. The cable 16 is similar to cable 14 and has an outer jacket 24, several inner jackets 26 and optical conductors 28.

Figure 2:
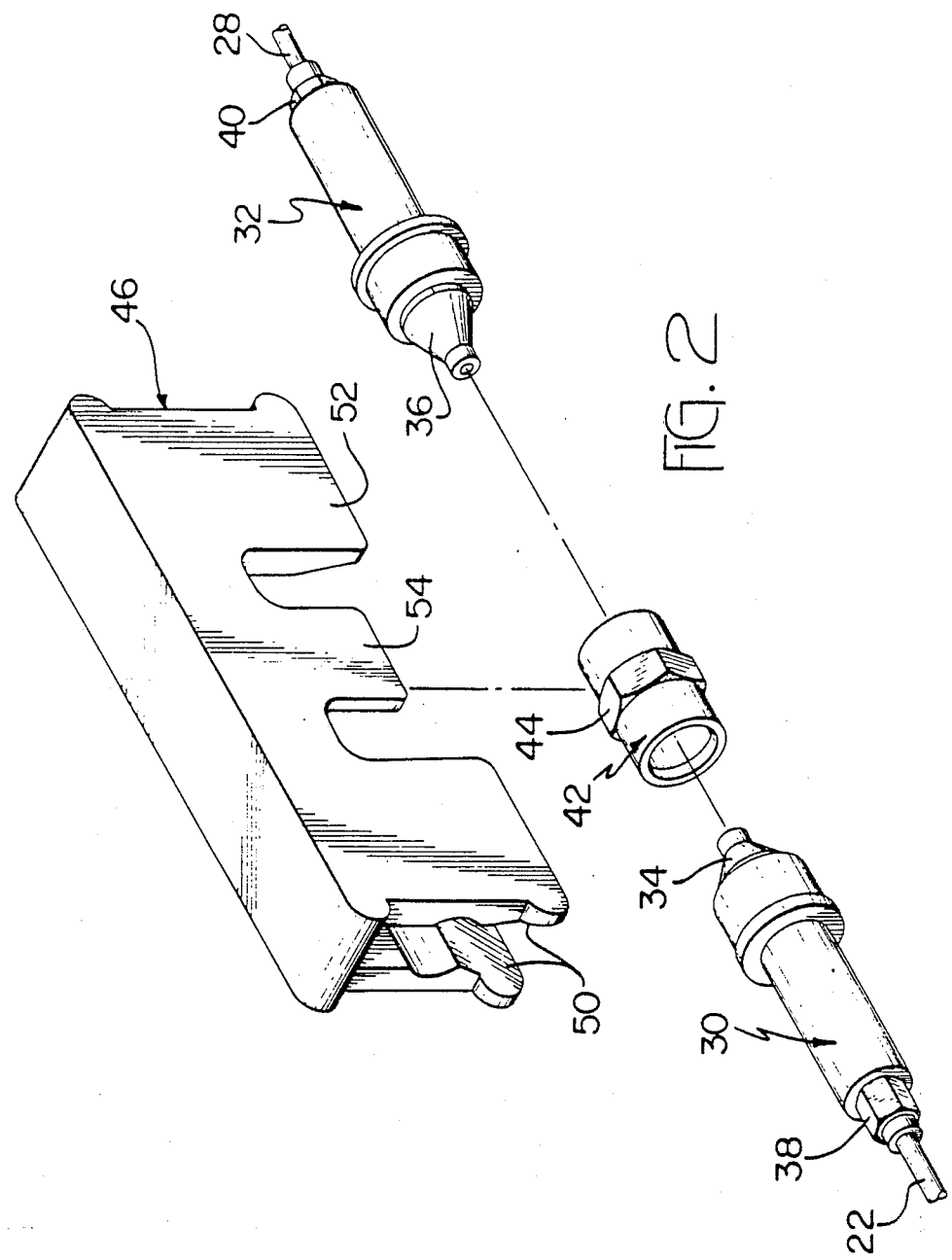
FIG. 2 is a fragmentary perspective illustration, with portions of the illustration separated, of a pair of optical conductors of the optical cables shown in FIG. 1, optical connector bodies terminated to the optical conductors, and a sleeve housing for an optical splice formed by the optical connector bodies in axial alignment within the sleeve housing.
Figure 3:
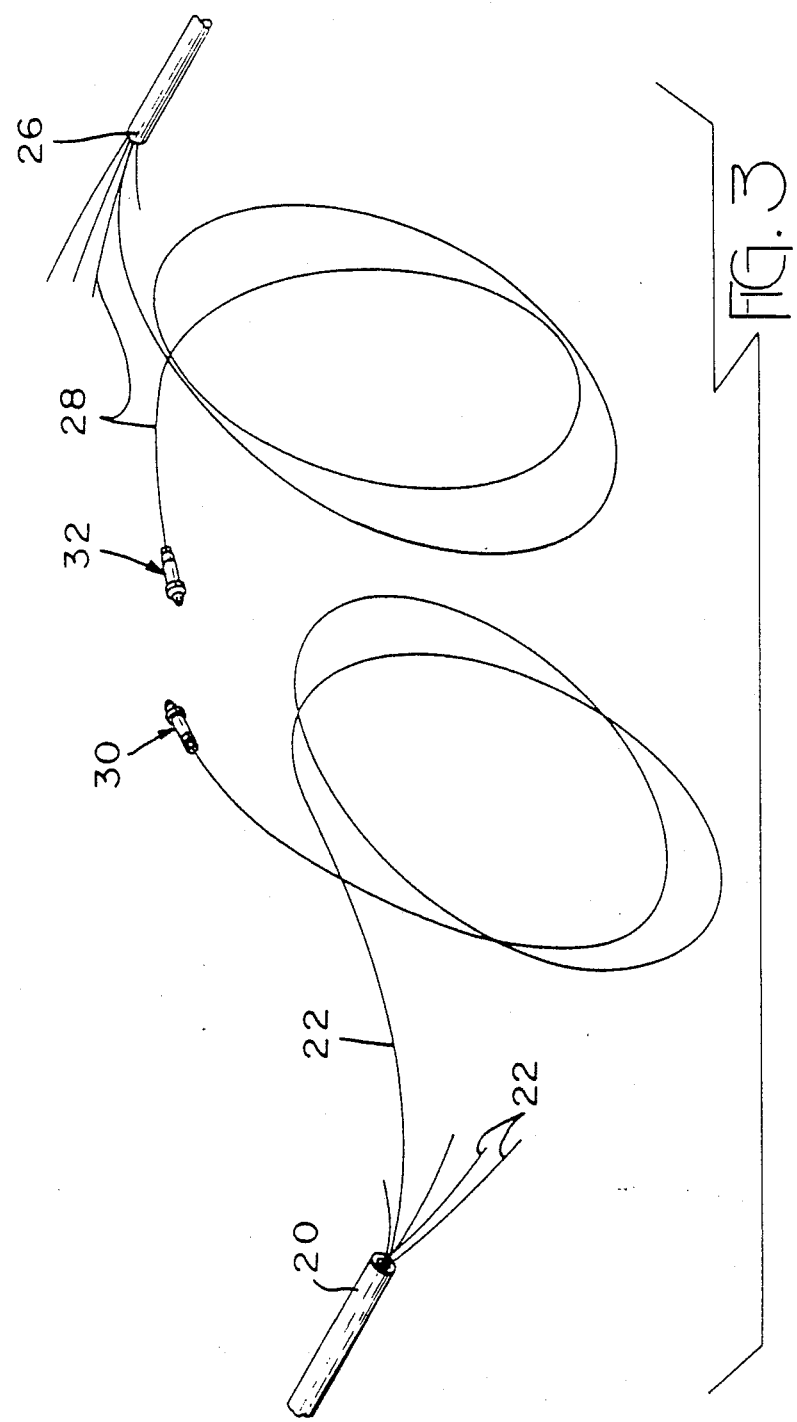
FIG. 3 is a schematic view of the optical conductors and the connector bodies of FIG. 2.

As shown in FIGS. 1, 2 and 3, the conductors 22 and 28 are terminated to corresponding connector bodies 30 and 32 generally of tubular form, having frustoconical mating ends 34 and 36 and rotatable ends 38 and 40 of hexagonal cross section. The mating ends 34 and 36 may be inserted into corresponding open ends of a sleeve housing 42 having a hexagonal cross section that provides flat surfaces 44. The sleeve housing 42 axially aligns the mating ends 34 and 36, to align also the ends of the corresponding conductors 22 and 28 that are terminated to the connector bodies 30 and 32. The aligned conductors 22 and 28 thereby are spliced or are said to form an optical splice, which means that optical signals can be transferred from one of the aligned conductors 22 or 28 to the other aligned conductor. The ends 38 and 40 of the connector bodies 30 and 32 are joined to corresponding conductors 22 and 28 and are individually rotatable with respect to sleeve housing 42, and hence with respect to each other, for rotating the corresponding conductors within the connector bodies 30 and 32, to adjust the axes of the individual conductors 22 and 28 along a common axis of alignment within the sleeve housing 42. It is to be understood that within the splice closure space additional conductors 22 are terminated to corresponding connector bodies 30, additional conductors 28 are terminated to corresponding connector bodies 32, and additional splices are formed by the connector bodies 30 in alignment with corresponding connector bodies 32 within corresponding sleeve housings 42.

A splice holder 46 is moulded of a plastic material, and is in the form of a channel having a closed side 48. A first pair of opposed resilient gripping fingers 50 project from the closed side 48 and are formed with profiles to receive and grip therebetween a connector body 30. A second pair of opposed resilient gripping fingers 52 project from the closed side 48 and are formed with profiles to receive and grip therebetween a connector body 32 a third pair of opposed resilient gripping fingers 54 project from the closed side 48 and are between the first pair of fingers 50 and the second pair of fingers 52. The fingers 54 are formed with profiles to receive and grip therebetween a sleeve housing 42 along its flat surfaces 44. An open side of the channel is defined between the opposed fingers 50, the opposed fingers 52 and the opposed fingers 54. It is understood that a similar splice holder 46 is provided for each optical splice formed by an aligned pair of corresponding connector bodies 30 and 32 in axial alignment within a corresponding sleeve housing 42.

Shaped preferably as shown in FIGS. 4, 5 and 6, a splice organizer 256 for the splice closure assembly according to this invention is preferably made from transparent plastic material molded to provide a thin flat wall, of approximately circular shape, defined by parallel surfaces 258 and 260. One surface forms an outside wall 260 and the other forms an inside wall 258 integral with a peripheral ridge 264 of uniform height normal thereto which defines a smooth short cylindrical wall 266 around approximately two-thirds of a circumference. Ridge 264 is symmetrical about a plane aligned with the axis of cylindrical inside wall 266 thereof. The line of intersection between this plane and surface 258 will be referred to as the line of symmetry, hereinafter, for convenience. Therefore, when two such organizers are placed in contact, front to back, a parallel sided compartment or pocket is formed between them, defined by the outside surface 260 (flat) of one organizer and the inside surfaces 258 (flat) and 266 (cylindrical) of the other organizer, to serve as an open receptacle for, and identification of, a pair of optical conductor lengths joined at their ends by an optical splice placed within, as shown in FIGS. 4 and 6 and more fully discussed below.

Two rectangularly shaped notches, 292 and 294, each with its longest side parallel to the line of symmetry, are located on a diameter of cylindrical surface 266 that is normal to the line of symmetry. Notches 292 and 294 are sized to accommodate supporting bars 6 and 8 but are slightly smaller in depth than the thickness of the bars. Holes 270 are provided, one on either side of each of notches 292 and 294, to receive screws passing through matchingly spaced holes in rectangular clamp bars 296 (see FIG. 10) as shown in FIGS. 4 and 7. Each organizer 256 can be positioned at notches 292 and 294 between parallel rectangular bars 6 and 8 and clamp bars 296 lightly screwed into holes 270 to allow organizer 256 to slide along bars 6 and 8 within the space 12. Tightening of the screws then will cause clamp bars 296 to be drawn in towards notches 292 and 294, thus firmly affixing organizer 256 in its desired location.

Each organizer has, symmetrically disposed about its line of symmetry, round-ended cuts 280, 281, 282 and 283 that are sized to frictionally hold in optical cables 20 and 26 as indicated in FIG. 1. Cuts or recesses 281, 282 and 283 are provided with narrow extensions to augment their flexibility in receiving optical cables 20 and 26.

To ensure exact and positive fit between adjacent organizers 256, each is provided at the top of ridge 264 with a plurality of round-ended male pin-type extensions 265 that can be pressed in interference fit into like-positioned female openings 261 of the next organizer. Thus a stack of organizers 256 can be created by pressing each front-to-back into its neighbor. If this is done, the stack can generally be affixed between supporting bars 6 and 8 without necessarily using a pair of clamping bars 296 on each organizer 256. The very last organizer, with its inside face 258 and 266 exposed, is provided with a plane flat cover 296, as shown in FIGS. 9a, and 9b, to form the last receptacle. Flat cover 296 has apertures 261 positioned and sized to fit pins 265, has recesses 280 to receive conductor cables, and has rectangular cuts 299 on each side to accommodate supporting bars 6 therein. Thus each individual organizer provides a single receptacle for an optical conductor splice and storage of coiled portions of the two optical conductors spliced thereby. Each receptacle thereby contains and protects coiled lengths of the conductors 22 and 28, spliced together by connector bodies 30 and 32, from tangling, snagging or breaking.

In first splicing two optical communications cables, a worker mounts the splice closure assembly 1 to the end portions of the cables 14 and 16, as shown in FIG. 1, and trims the cable jacket to expose lengths of the smaller optical cable jackets 20 and 26 that protrude from the optical communications cables 14 and 16 within the splice closure space. The smaller jackets 20 and 26 are placed by the worker in corresponding recesses 280–283, while the conductors 22 and 28 protruding from the jackets are terminated to corresponding connector bodies 30 and 32 within corresponding sleeve housings 42 and frictionally assembled in corresponding splice holders 46. The splice holders 46 are then mounted on corresponding splice mounting means 68 or 74 of selected receptacles 56. The lengths of conductors 22 and 28 extending from the jackets are coiled and placed in the compartments 84 or 88 associated with the selected receptacles 56. An end plate 296 is fitted onto the last open organizer to form the last compartment thereat. Alignment of individual optical conductors spliced together by connector bodies 30 and 32 is then obtained by suitably designed tuning wrenches insertable via cuts 280 to engage the hexagonal ends connector bodies 30 and 32 to rotate them and the optical conductors within them relative to each other. A generally cylindrical cover is provided around the splice closure assembly to provide suitable sealing of its contents against the ravages of weather, dust, moisture and corrosion as appropriate under the prevailing conditions of use.

Subsequently, to inspect, adjust or repair any individual splice within the splice closure assembly a worker removes the outside cylindrical cover and obtains access to the particular splice that is of interest.

Although a preferred form of the splice organizer is disclosed, other modifications are intended to be covered by the spirit and scope of the claims. Hence, for example, multiple splice organizers may be stacked together and supported against each other, and the number of pairs of clamping bars 297 need not correspond with the number of multiple organizers. Therefore, the invention is not considered to be limited to the embodiment disclosed.

In this application reference is made to a plurality of sheathed optical fibers as the optical communications cable. It will be understood that the individual optical fibers are also referred to in the art as optical conductors.

What is claimed is:

1. In a splice organizer for optical conductors projecting from corresponding optical cables, for optical connector bodies connected to respective ends of the optical conductors, and for optical splices formed by the connector bodies being in opposed pairs to align respective ends of the optical conductors, a pair of similar receptacles each having a side wall, an open side and a ridge projecting from the side wall to the open side for mounting against a side wall of a similar receptacle to provide a compartment for said optical conductors, the improvement comprising:

splice mounting means for mounting said splices and projecting from each corresponding side wall and extending in the same direction as a corresponding said ridge, pin extensions projecting from each corresponding said ridge, openings in each corresponding said side wall in alignment with the pin extensions projecting from the ridge of the same corresponding said side wall of the same receptacle, said openings being constructed for interference fit engagement with corresponding pin extensions of a corresponding said similar receptacle, optical conductor receiving openings into respective compartments defined between the splice mounting means and the ridges of respective receptacles, the openings providing entrances of said compartments for receiving said optical conductors and, a series of cable receiving recesses in the side wall of each corresponding receptacle and distributed between the splice mounting means and the ridge of each corresponding receptacle, the recesses of one receptacle being in alignment with the recesses of a corresponding said similar receptacle across a corresponding said entrance of a corresponding said similar receptacle.

2. A splice organizer as recited in claim 1, wherein:
each receptacle receives one optical splice at an entrance to the corresponding receptacle, and each entrance receives coiled lengths of corresponding optical conductors extending from said one optical splice, said optical splice being positioned to retain and provide identification of said coiled optical conductors within said receptacle.

3. A splice organizer as recited in claim 1, wherein:
each receptacle receives one optical splice at an entrance to the corresponding receptacle, and each entrance receives coiled lengths of corresponding optical conductors extending from said one optical splice, said optical splice being positioned to retain said coiled fibers within said receptacle.

4. A splice organizer as recited in claim 1, the improvement further including a channel shaped splice holder having an open side and a closed side and opposed pairs of gripping fingers extending from the closed side for gripping and retaining a corresponding pair of optical connector bodies.

5. A splice organizer as recited in claim 4, wherein said gripping fingers of said splice holder are removably retained between receptacles by extending pins of said splice mounting means.

6. A splice organizer as recited in claim 1, wherein the improvement further comprises, a boundary of each of said compartments is defined by a corresponding side wall engaging a corresponding ridge of a similar receptacle.

7. A splice organizer as recited in claim 1, wherein each pin extension of each said receptacles is constructed to engage in interference fit with an adjacent said receptacle, and comprises a moulded cylindrical pin of a diameter and height extending normal to a corresponding said ridge, and a corresponding said recess extends in alignment with and underneath each said pin.

8. A splice organizer as recited in claim 1, wherein a flat end cover covers a corresponding said ridge of one of said receptacles and provides a side wall for the compartment of said one of said receptacles.

* * * * *